(12) United States Patent
Pickford et al.

(10) Patent No.: US 9,433,237 B2
(45) Date of Patent: Sep. 6, 2016

(54) CRUMB MANUFACTURE

(71) Applicant: Crisp Sensation Holding S.A., Geneva (CH)

(72) Inventors: Keith Graham Pickford, Manchester (GB); Kees van Doorn, Tilburg (NL); Carry Reichgelt, Riethoven (NL)

(73) Assignee: Crisp Sensation Holding S.A., Geneva (CH)

( * ) Notice: Subject to any disclaimer, the term of this patent is extended or adjusted under 35 U.S.C. 154(b) by 0 days.

(21) Appl. No.: 14/505,402

(22) Filed: Oct. 2, 2014

(65) Prior Publication Data

US 2015/0086697 A1  Mar. 26, 2015

Related U.S. Application Data

(63) Continuation of application No. 14/029,681, filed on Sep. 17, 2013, now abandoned, which is a continuation of application No. 13/331,900, filed on Dec. 20, 2011, now abandoned.

(51) Int. Cl.
| | |
|---|---|
| A23L 1/176 | (2006.01) |
| A23L 1/00 | (2006.01) |
| A23L 1/0522 | (2006.01) |
| A23L 1/0524 | (2006.01) |
| A23L 1/0526 | (2006.01) |
| A23L 1/053 | (2006.01) |
| A23L 1/0532 | (2006.01) |

(52) U.S. Cl.
CPC .......... *A23L 1/176* (2013.01); *A23L 1/0076* (2013.01); *A23L 1/053* (2013.01); *A23L 1/0522* (2013.01); *A23L 1/0524* (2013.01); *A23L 1/0526* (2013.01); *A23L 1/0532* (2013.01); *A23V 2002/00* (2013.01)

(58) Field of Classification Search
CPC ... A23L 1/176; A23L 1/0076; A23L 1/0526; A23L 1/053; A23L 1/0532; A23L 1/0522; A23L 1/0524
See application file for complete search history.

(56) References Cited

U.S. PATENT DOCUMENTS

| | | |
|---|---|---|
| 2,446,175 A | 8/1948 | Gerber .......................... 241/65 |
| 3,067,921 A | 12/1962 | Reifers |
| 3,052,545 A | 9/1963 | Ducharme et al. |
| 3,208,851 A | 9/1965 | Antinori et al. |
| 3,251,531 A | 5/1966 | Hook et al. |

(Continued)

FOREIGN PATENT DOCUMENTS

| | | |
|---|---|---|
| CA | 980164 | 12/1975 |
| DE | 2220528 | 12/1972 |

(Continued)

OTHER PUBLICATIONS

Altschul, A.M., "Low-calorie foods handbook", Georgetown University School of Medicine, Marcel Dekker, Inc., Jul. 29, 1993, pp. 1-10.

(Continued)

*Primary Examiner* — Tamra L. Dicus
(74) *Attorney, Agent, or Firm* — Price Heneveld LLP

(57) ABSTRACT

A method of manufacture of a breadcrumb coating for a food product provides a crumb with an extremely low moisture content without the need for substantial energy input. The method achieves such very low moisture content without significant adverse effect on product quality.

20 Claims, 2 Drawing Sheets

(56) References Cited

U.S. PATENT DOCUMENTS

| | | |
|---|---|---|
| 3,399,062 A | 8/1968 | Willard, Jr. et al. |
| 3,486,904 A | 12/1969 | Ziegler |
| 3,586,512 A | 6/1971 | Mancuso et al. |
| 3,597,227 A | 8/1971 | Murray et al. |
| 3,619,208 A | 11/1971 | Bahoshy et al. |
| 3,656,969 A | 4/1972 | Horn |
| RE27,531 E | 12/1972 | Murray et al. |
| 3,751,268 A | 8/1973 | van Patten et al. |
| 3,857,976 A | 12/1974 | Szymanski et al. |
| 3,899,602 A | 8/1975 | Rutenberg et al. |
| 3,904,429 A | 9/1975 | Eastman et al. |
| 3,904,601 A | 9/1975 | Tessler et al. |
| 3,915,532 A | 10/1975 | Ashton |
| 3,956,515 A | 5/1976 | Moore et al. |
| 3,969,340 A | 7/1976 | Tessler et al. |
| 3,970,767 A | 7/1976 | Tessler et al. |
| 4,020,564 A | 5/1977 | Bayliss ............ 34/585 |
| 4,068,009 A | 1/1978 | Rispoli et al. |
| 4,192,900 A | 3/1980 | Cheng |
| 4,208,442 A | 6/1980 | Evans et al. |
| 4,218,485 A | 8/1980 | Lee et al. |
| 4,260,637 A | 4/1981 | Rispoli et al. ............ 426/96 |
| 4,308,286 A | 12/1981 | Anstett et al. |
| 4,342,788 A | 8/1982 | Chatfelter |
| 4,364,961 A | 12/1982 | Darley et al. ............ 426/19 |
| 4,393,088 A | 7/1983 | Matsusaka |
| 4,415,599 A | 11/1983 | Bos |
| 4,423,078 A | 12/1983 | Darley et al. |
| 4,427,706 A | 1/1984 | El-Hag |
| 4,440,793 A | 4/1984 | Seki |
| 4,568,550 A | 2/1986 | Fulger et al. |
| 4,568,555 A | 2/1986 | Spanier |
| 4,588,600 A | 5/1986 | Suderman |
| 4,597,974 A | 7/1986 | Fonteneau et al. |
| 4,609,557 A | 9/1986 | Mao et al. |
| 4,609,558 A | 9/1986 | Giacone et al. |
| 4,623,552 A | 11/1986 | Rapp |
| 4,767,637 A | 8/1988 | Ek |
| 4,778,684 A | 10/1988 | D'Amico et al. |
| 4,864,089 A | 9/1989 | Tighe et al. |
| 4,877,628 A | 10/1989 | Stypula |
| 4,908,487 A | 3/1990 | Sarnoff et al. |
| 4,913,918 A | 4/1990 | Stypula |
| 4,915,970 A | 4/1990 | Coffey |
| 4,916,831 A | 4/1990 | Yasumura et al. ............ 34/134 |
| 4,943,438 A | 7/1990 | Rosenthal |
| 4,948,608 A | 8/1990 | Stypula et al. |
| 4,978,541 A | 12/1990 | Stypula et al. |
| 5,049,711 A | 9/1991 | August |
| 5,057,329 A | 10/1991 | Stypula et al. |
| 5,088,179 A | 2/1992 | Gibbon |
| 5,093,176 A | 3/1992 | Pribonic et al. |
| 5,175,010 A | 12/1992 | Roig et al. |
| 5,202,138 A | 4/1993 | Stypula et al. |
| H1229 H | 9/1993 | McGinley et al. |
| 5,266,340 A | 11/1993 | Samson et al. |
| 5,281,432 A | 1/1994 | Zallie et al. |
| 5,308,636 A | 5/1994 | Tye et al. |
| 5,310,977 A | 5/1994 | Stenkamp et al. |
| 5,310,980 A | 5/1994 | Beckett et al. |
| 5,321,900 A | 6/1994 | Meyer |
| 5,350,585 A | 9/1994 | Sunderland |
| 5,423,477 A | 6/1995 | Valdman et al. |
| 5,431,944 A | 7/1995 | Melvej |
| 5,433,966 A | 7/1995 | Wolt et al. |
| 5,492,707 A | 2/1996 | Chalupa et al. |
| 5,523,102 A | 6/1996 | Morasch |
| 5,565,132 A | 10/1996 | Sayler |
| 5,601,861 A | 2/1997 | Gerrisch et al. |
| 5,736,178 A | 4/1998 | Cook et al. |
| 6,097,017 A | 8/2000 | Pickford |
| 6,214,403 B1 | 4/2001 | Broberg et al. |
| 6,261,625 B1 | 7/2001 | Pickford |
| 6,287,621 B1 | 9/2001 | Lacourse et al. |
| 6,288,179 B1 | 9/2001 | Baur et al. |
| 6,326,599 B1 | 12/2001 | Pickford |
| 6,399,130 B2 | 6/2002 | Parker |
| 6,413,562 B2 | 7/2002 | Conforti et al. |
| 6,458,404 B1 | 10/2002 | Adachi |
| 6,503,546 B1 | 1/2003 | Ferrari-Philippe et al. |
| 6,613,370 B1 | 9/2003 | Pickford |
| 6,620,447 B1 | 9/2003 | Paukkunen et al. |
| 7,147,885 B2 | 12/2006 | Asano et al. |
| 8,765,202 B2 | 7/2014 | Pickford |
| 2001/0014363 A1 | 8/2001 | Parker |
| 2001/0024672 A1 | 9/2001 | Kondou et al. |
| 2001/0055641 A1 | 12/2001 | Conforti et al. |
| 2002/0039615 A1 | 4/2002 | Adachi |
| 2002/0119226 A1 | 8/2002 | Conforti et al. |
| 2002/0192332 A1 | 12/2002 | Pickford |
| 2003/0147998 A1 | 8/2003 | Geng et al. |
| 2003/0198711 A1 | 10/2003 | Pickford |
| 2004/0213883 A1 | 10/2004 | Sadek et al. |
| 2005/0169099 A1 | 8/2005 | Sprinkle |
| 2006/0053650 A1 | 3/2006 | Manack et al. |
| 2006/0286240 A1 | 12/2006 | Roosjen |
| 2011/0091612 A1 | 4/2011 | Pickford |
| 2011/0177200 A1 | 7/2011 | Pickford |
| 2011/0177210 A1 | 7/2011 | Pickford |
| 2011/0177211 A1 | 7/2011 | Pickford |
| 2012/0196004 A1 | 8/2012 | Pickford |
| 2012/0196005 A1 | 8/2012 | Pickford |
| 2012/0288592 A1 | 11/2012 | Pickford |
| 2013/0156925 A1 | 6/2013 | Pickford et al. |
| 2014/0087051 A1 | 3/2014 | Pickford et al. |
| 2014/0093615 A1 | 4/2014 | Pickford |

FOREIGN PATENT DOCUMENTS

| | | |
|---|---|---|
| DE | 2338180 | 2/1975 |
| EP | 17338 | 10/1980 |
| EP | 109226 | 5/1984 |
| EP | 0155760 | 9/1985 |
| EP | 327332 | 8/1989 |
| EP | 344726 | 12/1989 |
| EP | 392119 | 10/1990 |
| EP | 510320 | 2/1992 |
| EP | 273475 | 3/1992 |
| EP | 648433 | 10/1994 |
| EP | 1929887 | 6/2008 |
| EP | 2207434 | 8/2011 |
| EP | 2359697 | 8/2011 |
| EP | 2374361 | 10/2011 |
| EP | 2481294 | 8/2012 |
| EP | 2481295 | 8/2012 |
| FR | 2337534 | 8/1977 |
| FR | 2343668 | 10/1997 |
| GB | 1419455 | 12/1975 |
| GB | 2226220 | 11/1988 |
| JP | 57-159451 | 10/1982 |
| JP | 01-168242 | 7/1989 |
| WO | 85/01188 | 3/1985 |
| WO | 88/06007 | 8/1988 |
| WO | 88/06847 | 9/1988 |
| WO | 89/08549 | 9/1989 |
| WO | 92/01384 | 2/1992 |
| WO | 93/03634 | 3/1993 |
| WO | 93/06752 | 4/1993 |
| WO | 93/14995 | 8/1993 |
| WO | 94/13160 | 6/1994 |
| WO | 94/19917 | 9/1994 |
| WO | 94/27887 | 12/1994 |
| WO | 95/07629 | 3/1995 |
| WO | 95/23523 | 9/1995 |
| WO | 95/24110 | 9/1995 |
| WO | 95/30344 | 11/1995 |
| WO | 96/02149 | 2/1996 |
| WO | 96/22228 | 7/1996 |
| WO | 96/32026 | 10/1996 |
| WO | 96/38054 | 12/1996 |
| WO | 97/03572 | 2/1997 |
| WO | 97/29653 | 8/1997 |
| WO | 98/08399 | 3/1998 |
| WO | 99/44439 | 9/1999 |

(56) References Cited

FOREIGN PATENT DOCUMENTS

| WO | 2005/112664 | 12/2005 |
|---|---|---|
| WO | 2006/030333 | 3/2006 |
| WO | 2006/082804 | 8/2006 |
| WO | 2008/078997 | 7/2008 |
| WO | 2010/001101 | 1/2010 |

OTHER PUBLICATIONS

Albert, A. et al., "Adhesion in fried battered nuggets: Performance of different hydrocolloids as predusts using three cooking procedures", Food Hydrocolloids 23 (2009) 1443-1448.
Henderson, A., "Cellulose ethers—the role of thermal gelation", Dow Chemical Europe, CH-8810 Horgen, Switzerland, 1988, pp. 265-275.
WO application No. PCT/GB96/01685, International Search Report mailed Oct. 29, 1996.
WO application No. PCT/GB97/00924, International Search Report mailed Jul. 30, 1997.
WO application No. PCT/GB99,00564, International Search Report mailed Jun. 29, 1999.
WO application No. PCT/GB92/01559, International Search Report mailed Dec. 30, 1992.
WO application No. PCT/GB95/00958, International Search Report mailed Aug. 22, 1995.
WO patent application No. PCT/GB2011/050060, International Search Report and Written Opinion mailed May 23, 2011.
WO patent application No. PCT/GB2011/050057, International Search Report mailed May 23, 2011.
WO patent application No. PCT/GB2011/050055, International Search Report and Written Opinion mailed May 20, 2011.
U.S. Appl. No. 09/000,319, Office Action mailed Feb. 3, 1999.
U.S. Appl. No. 09/000,319, Office Action mailed Mar. 27, 2000.
U.S. Appl. No. 09/381,848, Office Action mailed Sep. 26, 2000.
U.S. Appl. No. 09/381,848, Office Action mailed May 8, 2001.
U.S. Appl. No. 09/646,068, Office Action mailed May 8, 2002.
U.S. Appl. No. 09/646,068, Office Action mailed Feb. 4, 2003.
EP patent application No. 11152421.1, Extended Search Report mailed Jul. 5, 2011.
EP patent application No. 11152415.3, Extended Search Report mailed Jul. 5, 2011.
U.S. Appl. No. 12/764,428, Office Action mailed Jan. 5, 2012.
U.S. Appl. No. 12/764,428, Office Action mialed Jun. 21, 2012.
U.S. Appl. No. 12/764,407, Office Action mailed Oct. 5, 2012.
U.S. Appl. No. 12/764,421, Office Action mailed Oct. 9, 2012.
U.S. Appl. No. 13/015,486, Office Action mailed Oct. 12, 2012.
FoodSafety.gov, "Minimum Cooking Temperatures," downloaded from http://www.foodsafety.gov/keep/charts/mintemp.html on Sep. 30, 2012.
Kuntz, Lynn A., "The Great Cover-Up: Batters, Breadings & Coatings," downloaded from http://www.foodproductdesign.com on Sep. 28, 2012.
U.S. Appl. No. 13/015,491, Office Action mailed Oct. 15, 2012.
WO patent application No. PCT/GB2009/001617, Search Report and Written Opinion mailed Jul. 1, 2008.
EP patent application No. 09772781.2, Communication under Rule 71(3) EPC, intent to grant, mailed Mar. 14, 2011.

Clextral Press Release: New drying technology provides optimal drying for complex products and reduces energy expense, Clextral—a division of Groupe Legris Industries, Jun. 2009.
Clextral Rotante Evolum dryer—new generation for sustainable development, Clextral—a division of Groupe Legris Industries, Jun. 2009.
EP patent application No. 1119483.6, Extended European Search Report mailed Aug. 10, 2012.
Perten, Harald, "Application of the falling number method for evaluating alpha-amylase activity," Cereal Chemistry, vol. 41, May 1964, pp. 127-140.
English translation of Paris GDS Moulins FR 2,458,227, Jan. 1981.
Edwards, W.P., "The Science of Bakery Products," Chapter 7—Raw Materials, The Royal Society of Chemistry, 2007.
English translation of Wiedmann et al., EP 0510320A1, Oct. 1992, downloaded from http://translationportal.epo.org on Jan. 25, 2013.
"Criteria for Judging Quality," published Jun. 20, 2008, downloaded from http://web.archive,org/web/20080620034754http://www.theartisan.net/flour_criteria_judging.htm on Jan. 25, 2013.
English translation of RU 2277438, Rye-wheat bread and its proI3vodstva, Berestnev et al., Jun. 10, 2006.
U.S. Appl. No. 13/015,486, Office Action mailed Feb. 19, 2013.
EP patent application No. 11163536.3, Communication under Rule 71(3) EPC, Intent to Grant, mailed May 30, 2013.
U.S. Appl. No. 14/032,881, "Microwaveable Batter," Keith Graham Pickford, filed Sep. 20, 2013.
U.S. Appl. No. 12/764,407, Office Action mailed Oct. 25, 2013.
U.S. Appl. No. 13/015,491, Office Action mailed Nov. 8, 2013.
U.S. Appl. No. 14/105,847, "Stabilized Cheese Products," van der Kolk et al., filed Dec. 13, 2013.
U.S. Appl. No. 13/015,486, Office Action mailed Jan. 6, 2014.
U.S. Appl. No. 12/764,407, Notice of Allowance mailed Feb. 12, 2014.
U.S. Appl. No. 13/107,814, Office Action mailed Feb. 13, 2014.
U.S. Appl. No. 14/170,371, "Microwaveable Batter," Wilhelmus Johannes Gerardus Michiels et al., filed Jan. 31, 2014.
U.S. Appl. No. 14/029,681, Office Action mailed Apr. 2, 2014.
U.S. Appl. No. 12/764,421, Notice of Allowance mailed Apr. 11, 2014.
U.S. Appl. No. 14/249,250, "Stabilisation of microwave heated food substrates," Keith Graham Pickford, filed Apr. 9, 2014.
U.S. Appl. No. 14/266,611, "Coated stabilized microwave heated foods," Keith Graham Pickford, filed Apr. 30, 2014.
U.S. Appl. No. 13/015,486, Office Action mailed Jul. 1, 2014.
U.S. Appl. No. 13/953,585, Office Action mailed Jul. 8, 2014.
U.S. Appl. No. 14/458,051, "Microwaveable Batter," Keith Graham Pickford, filed Aug. 12, 2014.
U.S. Appl. No. 13/015,491, Office Action mailed Sep. 11, 2014.
U.S. Appl. No. 13/331,900, Office Action mailed Dec. 7, 2012.
U.S. Appl. No. 12/764,428, Office Action mailed Mar. 22, 2013.
U.S. Appl. No. 12/764,421, Office Action mailed Apr. 1, 2013.
U.S. Appl. No. 12/764,407, Office Action mailed Apr. 5, 2013.
U.S. Appl. No. 13/331,900, Office Action mailed Apr. 10, 2013.
EP patent application No. 12178463, European Search Report mailed Jan. 22, 2013.
WO patent application No. PCT/EP2012/076015, International Search Report and Written Opinion mailed May 7, 2013.
U.S. Appl. No. 13/015,491, Office Action mailed Jun. 5, 2013.
U.S. Appl. No. 13/107,814, Office Action mailed Jun. 21, 2013.
U.S. Appl. No. 12/669,953, Notice of Allowance mailed Jul. 25, 2013.

ND MANUFACTURE

CROSS REFERENCE TO RELATED APPLICATION

This application is a continuation of prior application Ser. No. 14/029,681 filed on Sep. 17, 2013, entitled CRUMB MANUFACTURE, now pending, which is a continuation of prior application Ser. No. 13/331,900 filed on Dec. 20, 2011, entitled CRUMB MANUFACTURE, now abandoned. Each of these prior applications is incorporated herein by reference in its entirety and for all purposes.

BACKGROUND

This invention relates to a process for manufacture of crumb. The invention also relates to crumb manufactured by the process and food products coated with the crumb. The invention relates particularly, but not exclusively, to crumb which includes a hydrocolloid or other gelling agent in order to impart water resistant characteristics.

Conventional breadcrumb may have a water content of about 4% to 12% and becomes soggy immediately upon immersion into water. Such crumb is inevitably for use in moist environments, particularly for coating microwaveable products.

WO99/44439 describes a process for manufacture of breadcrumb by extrusion of a dough mixture incorporating a gelling agent, particularly a hydrocolloid, to form pellets which are dried and milled. WO2010/001101 discloses a process wherein crumb is extruded with a gelling agent and dried to a moisture content of 2% or is dried in a fluid bed dryer at around 90° C. for fifteen minutes. Use of a fluid bed dryer may be undesirable due to creation of a large amount of airborne dust. Fluid bed dryers are designed to dry products as they float on a cushion of air or gas. The air or gas used in the process is supplied to the bed through a special perforated distributor plate and flows through the bed of solids at a velocity sufficient to support the weight of particles in the fluidised state. Bubbles form and collapse within the fluidised bed of material promoting intense particle movement.

DETAILED DESCRIPTION

Figure 1:
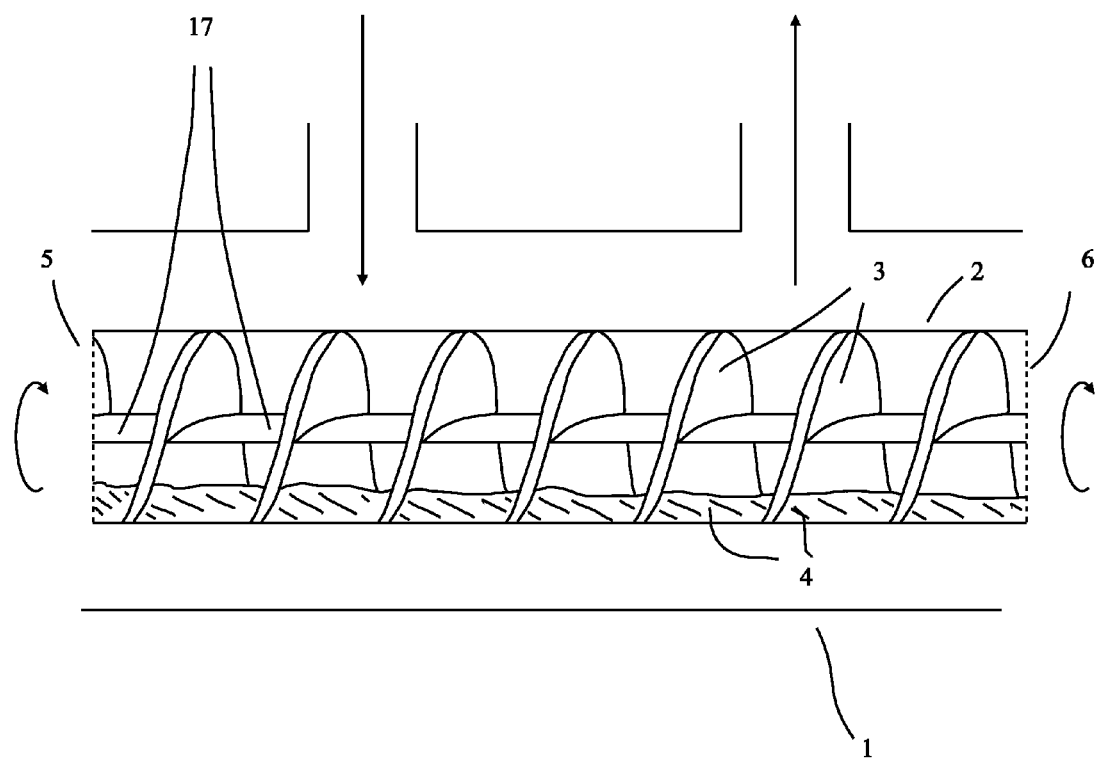
FIG. 1 is a schematic view of drying apparatus for use in accordance with an embodiment of the invention.

According to a first aspect of the present invention, a method of manufacture of a crumb comprises:

extruding a dough composition comprising flour, a gelling agent, optional further ingredients and water to form an extruded composition, wherein the gelling agent is uniformly distributed throughout the composition;

drying the extruded composition in a rotary dryer to form a dried composition, wherein the water content of the dried composition is from about 0.1% to about 1.5% by weight; and milling the dried composition to form a crumb with a water content of about 0.1% to about 1.5% by weight.

The present method offers the advantage that it enables the manufacture of a crumb with an extremely low moisture content without the need for substantial energy input. Furthermore, the method achieves such very low moisture content without significant adverse effect on product quality. Alternative drying techniques would typically achieve such very low moisture content at the cost of e.g. heat induced defects. The crumb according to the present invention offers the advantage that it is substantially more water resistant than crumb having a moisture level of about 2.0 wt % and/or crumb that does not contain a gelling agent. The high water resistance of the crumb obtained by the present method is particularly beneficial if this crumb is used in the manufacture of coated food products that are distributed in frozen form and that have to be heated before consumption.

Percentages and other quantities referred to in this specification are by weight, unless indicated otherwise.

In a preferred embodiment the rotary dryer comprises an inlet; an outlet; a passageway for the extruded composition; the passageway extending between the inlet and outlet; one or more drying units each comprising a perforated cylindrical tube extending between the inlet and outlet and a screw extending axially of the tube, wherein one of the tube and the screw are rotatable to move extruded composition from the inlet to the outlet; and means for circulating drying air through the passageway.

The rotary dryer may comprise at least four drying units assembled in a rotary cage located within a closed housing.

The apertures in the perforated cylindrical tubes are selected to be smaller than at least 90 wt % of the particles of the extruded composition. Preferably the dimension of the apertures in the perforated cylindrical tube is in the range of about 1 mm to about 5 mm.

The extruded composition is preferably dried in the rotary dryer using a countercurrent hot air stream. The countercurrent hot air stream typically has a temperature of 100° C.-160° C., more preferably of 130° C.-150° C., most preferably about 140° C. Flow rates of hot air employed in the present method are typically in the range of about 6 to about 15 m/s, preferably of 8-10 m/s.

This invention utilises a gelling agent, particularly a hydrocolloid, dispersed uniformly in a rigid extruded farinaceous matrix structure which when dried to a water content of 1.5% by weight or lower reduces hydration and swelling of the hydrocolloid upon exposure to moisture thus creating a water resistant barrier. The farinaceous matrix advantageously comprises low gluten wheat flour.

Without wishing to be bound by theory it is believed that upon exposure to moisture the gelling agent hydrates at the surface of the crumb or elsewhere in contact with moisture but cannot expand within the structure of the crumb. This may result in formation of a barrier to passage of water into the body of the crumb.

Preferably the particles have a maximum dimension between dust having a dimension of about 0.1 mm and about 5 mm. Crumb having a substantial absence of fine particles or dust may be used for outer coating of products. The dust may be used in the coating process as a predust or as an infill between larger particles.

Preferably, the water content of the dried composition and crumb is from about 0.3% to about 1%, more preferably about 0.5% to about 1%, most preferably about 0.5% to about 0.6%.

Crumb made by the method of this invention has the advantage of moisture resistance during cooking or reheating in a thermal, microwave or combined thermal and microwave oven. The crumb finds particular application for use in products which are frozen for storage before use. Uniform distribution of the gelling agent, especially a hydrocolloid, throughout the crumb imparts water resistance to the entire body of the crumb, and not to a superficial outer layer which may become damaged in use.

Reduction of the water content of the crumb below 1.5% confers an unexpected degree of moisture resistance to the crumb. Thus, the crumb can be used to produce a crumb coated food product which is crisp and has a crunchy texture. Without wishing to be bound by theory, it is believed that reduction of the water content as claimed reduces the rate of re-hydration of the gelling agent in contact with water, prolonging the period during which the crumb remains crisp. This is particularly important in crumb coated microwaveable products because steam emitted from the core of the product passes through the coating, making conventional crumb coated products soggy and unpalatable. The very low water content of the crumb further provides the unexpected advantage that the crumb exhibits a low pick-up of oil during frying.

The gelling agent is preferably a hydrocolloid which forms a gel or otherwise increases in viscosity when mixed with water. Preferred hydrocolloids produce a milled extrudate which retains shape when stirred in water having a temperature of 20° C. for a period of 60 seconds. The hydrocolloid provides a degree of water resistance reducing any tendency to pick up moisture from adjacent layers of the food product or surrounding materials. Typically, hydrocolloid is contained in the milled extrudate in a concentration of about 0.06% to about 4%, more preferably about 0.08% to about 3%, and most preferably about 0.1% to about 3% by weight.

Examples of hydrocolloids that may be used include natural gums, modified gums, gelatin, pectin, alginate, arabinogalactan, agar, carrageenan, furcellaran, modified starch and combinations thereof. Preferably the hydrocolloid is selected from natural gums and combinations thereof.

Examples of natural gums that may be suitably employed include guar gum, locust bean gum, gum arabic, tragacanth, gum karaya, gum ghatti, xanthan gum and combinations thereof.

Most preferably, the hydrocolloid is selected from guar gum, locust bean gum, xanthan gum and combinations thereof.

The extrudate may be cut into pieces upon discharge from the extruder in order to form pieces of solid farinaceous material. Preferably the pieces may expand to form rounded pellets or beads suitable for passage through a dryer before milling. The beads may have a maximum dimension of 0.5 cm to 1 cm.

The extruded composition obtained in the present method has a water content of about 0.1% to about 1.5 wt. %, more preferably of about 0.3 wt. %.

Extruded crumb may be manufactured as disclosed in WO2010/001101, the disclosure of which is incorporated into this specification by reference for all purposes.

In a preferred embodiment the dryer comprises an inlet, an outlet, a passageway for pieces of extrudate, the passageway extending between the inlet and the outlet, means for circulating drying air through the passageway and means for mixing the pieces of the extrudate during passage through the passageway; wherein the passageway comprises a perforated cylindrical tube extending between the inlet and outlet;

apertures in the tube having a maximum dimension arranged to retain extrudate particles within the tube;

the means for mixing comprising a screw extending axially of the tube; and one of the tube and screw being rotatable to move extrudate from the inlet to the outlet.

Preferably, the screw remains stationary as the tube rotates. Alternatively, the screw may rotate within a stationary tube. Rotation of the tube is preferred to cause thorough mixing of the extrudate particles during passage along the tube. Use of the apparatus in accordance with this aspect of the invention is advantageous because the particles are mixed by tumbling rather than application of a mechanical mixer. This reduces breakage of the particles and consequent formation of dust.

The tube may be constructed from wire mesh or perforated sheet material having apertures sufficiently small to retain the extrudate pieces. Dust or fine particles are separated from the pieces by being allowed to fall through apertures in the rotating tube into a collector at a lower part of the apparatus. For example a trough may be provided with an Archimedes screw for carrying dust out of the apparatus. Rotation of the tube has the advantage of agitating the dust or fine particles, promoting flow of the latter through the apertures in the tube, providing convenient separation of the fines from the pieces of extruded composition.

In particularly advantageous embodiments, a multiplicity of tubes are mounted in a dryer chamber, ventilation means being provided to circulate dry heated air within the chamber. Heat exchangers may be used to heat the air passing into or within the chamber.

A vibratory feeder may be used to introduce extrudate into the or each tube. A vibratory collector may be used to collect the dried extrudate.

The dryer chamber may be divided into two or more zones maintained at different temperatures or humidities. A first zone may be at a higher temperature, for example in the range from about 120° C. to about 160° C., preferably about 130° C. to about 150° C., more preferably about 140° C. A second zone may be at a lower temperature, for example in the range from about 80° C. to about 140° C., preferably about 90° C. to about 120° C., more preferably about 100° C. The dwell time in the dryer may be about 45 minutes to 90 minutes, preferably about 60 minutes.

Another aspect of the invention relates to a crumb comprising milled farinaceous particles of an extruded composition comprising flour, a gelling agent uniformly distributed throughout the crumb and optional further ingredients, wherein the total water content of the crumb is from about 0.1% to about 1.5% by weight, more preferably from about 0.3% to about 1%, even more preferably about 0.5% to about 1%, most preferably about 0.5% to about 0.6%.

Preferred embodiments of the present crumb have already been discussed above in relation to the manufacturing method.

The aforementioned crumb is preferably obtainable by the method described herein. Most preferably, the crumb is obtained by said method.

The invention is further described by means of example, but not in any limitative sense, with reference to the accompanying drawings.

EXAMPLES

Example 1

A flour composition was prepared from the following ingredients as follows:

| | |
|---|---|
| Flour mixture | 96.4% |
| Sodium bicarbonate (Bex ® baking powder) | 2.0% |

| | |
|---|---|
| Glyceryl Monostearate (Abimono SS40P) | 0.6% |
| Salt | 1.0% |
| | 100.0% |

A gelling composition was prepared from the following ingredients:

| | |
|---|---|
| Guar gum | 67.00% |
| Sodium metabisulphite | 33.00% |
| | 100.00% |

The gelling composition was hydrated at 3% w/w in 97% water. This can be done using a paddle mixer but a high shear mixer is preferred. The hydrated mixture was left to stand for at least 12 hours after mixing.

The flour composition (150 kg per hour) was mixed with water (35 kg per hour) to form a slurry. The slurry was fed into a Clextral™ twin-screw extruder was used (alternatively a Buhler™ twin-screw extruder may be used). The hydrated gelling composition was injected into the extruder barrel in an amount of 7.5% (13.88 kg per hour). The resultant extruded mixture was chopped into pieces and allowed to expand to form bubble-shaped pieces having a typical maximum dimension of 0.5 cm to 1.0 cm.

Example 2

The bubble-shaped pieces of extrudate were fed into the input of a dryer as shown schematically in FIG. 1.

The dryer comprised an outer casing (1) defining a chamber containing twelve gauze tubes (2) each having a diameter of about 30 centimeters and a length of about 11.5 metres. An Archimedes screw (3) with 57 turns and a pitch of 30 centimeters for each turn extends coaxially within each tube (2) adjacent the inner surface of the tube. The tubes are connected by a drive mechanism to a motor (not shown) and are arranged to rotate around the stationary Archimedes screws (3). Tumbling of crumb particles (4) against the surface of the screw causes the particles to move along the tubes from the inlet (5) to the outlet (6).

Figure 2:
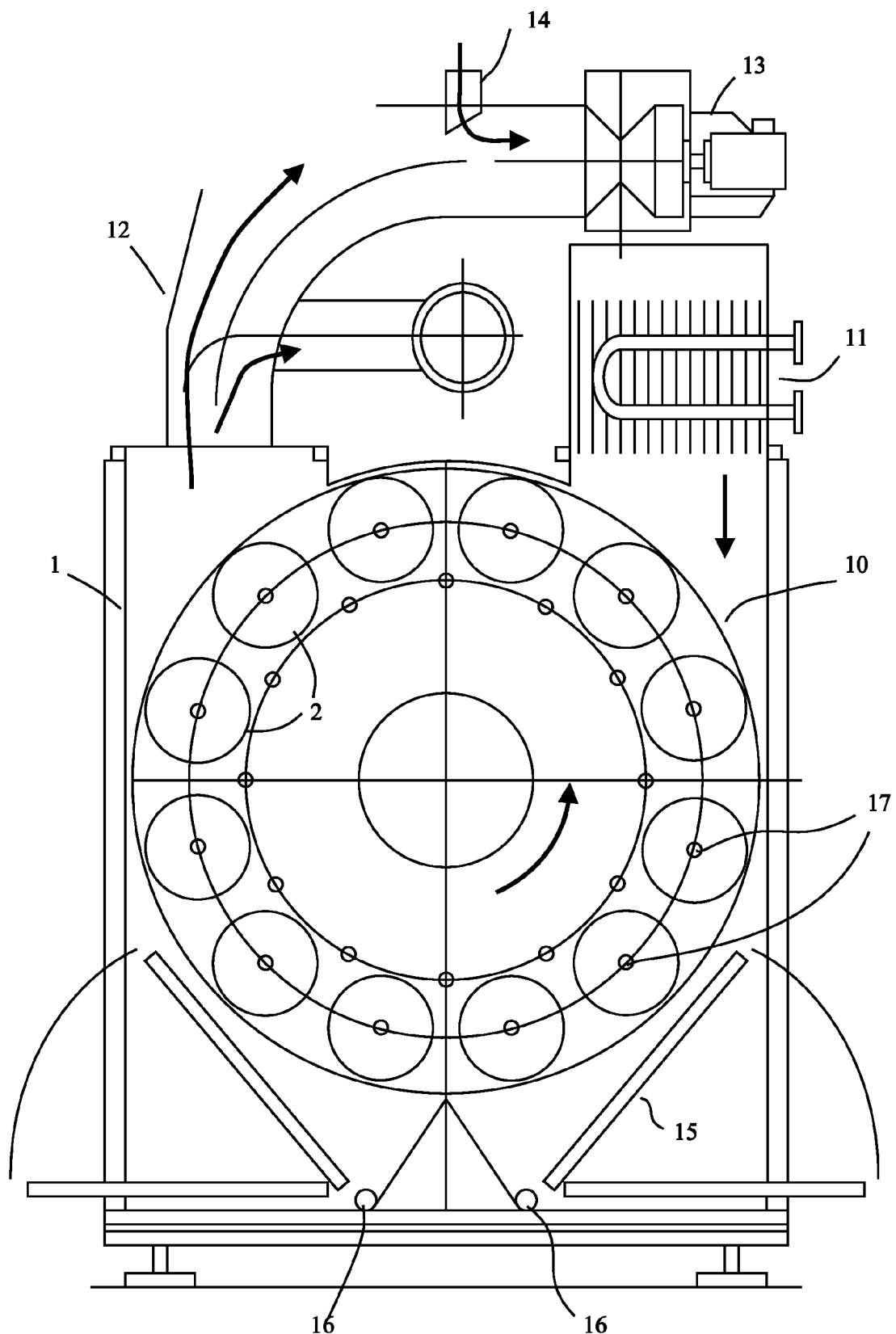
FIG. 2 is a cross-sectional view of a dryer for use in accordance with an embodiment of the invention.

FIG. 2 is a cross-sectional view of the dryer. The casing (1) encloses an array of twelve or other convenient number of cylindrical tubes (2) arranged in a cylindrical array (10) for rotation in the casing about a longitudinal axis. A drive mechanism (not shown), for example a chain drive, causes the tubes (2) to rotate about the axes (17) of Archimedes screws (3) (as shown in FIG. 1). A heat exchanger (11) provides heated air for circulation within the casing (1). Air is removed from an outlet (12) by a pump (13), arranged to recirculate air together with fresh air from inlet (14) to the heat exchanger (11).

Collector plates (15) located at a lower portion of the casing (1) beneath the array (10) of cylindrical tubes collects dust or other fines falling from the cylindrical tubes. Archimedes screws (16) serve to collect the dust and fines for delivery to an outlet (not shown).

An outer casing includes a chamber and an air circulation system including a heat exchanger to provide dry heated air. The chamber is divided into two or more zones. A first zone may be maintained at a first higher temperature, for example about 140° C. and a second zone may be maintained at a second lower temperature, for example about 100° C. Any convenient number of zones may be maintained at temperatures selected to provide an efficient drying profile to suit the dimensions and principal characteristics of the particles.

Each tube may have a diameter of about 30 cm and may surround a coaxial screw with a pitch of about 30 cm.

The retention time within the dryer may be adjusted by varying the rate of rotation of the tubes to provide a throughput of 1200 kg/hr and a dwell time in the dryer of about 60 minutes.

A vibratory feeding system may be provided to introduce undried particles into the tubes. Each tube may be provided with a separate loading shovel. A vibratory collector may be provided to collect dried particles for delivery to a mill.

The dried particles were milled using a roller mill.

The milled crumb was sieved and fractions were collected with dimensions of below 0.8 mm, from 0.8-2.0 mm and from 2.0 to 3.5 mm. The water content of the crumb was determined to be 0.5 wt % to 0.6 wt %.

The invention claimed is:

1. A method of manufacture of a crumb, the method comprising:
   extruding a dough composition comprising flour, a gelling agent chosen from the group consisting of natural gums, modified gums, pectin, alginate, arabinogalactan, agar, carrageenan, furcellaran, and combinations thereof, optional further ingredients and water using an extruder to form an extruded composition, wherein the gelling agent is added as a hydrated gelling agent at a point along the extruder downstream from the inlet wherein the gelling agent becomes uniformly distributed throughout the composition; and
   drying the extruded composition in a rotary dryer to form a dried composition, wherein the water content of the dried composition is from 0.1% to 1.5% by weight.

2. The method of claim 1, wherein the rotary dryer comprises an inlet; an outlet; a passageway for the extruded composition, the passageway extending between the inlet and outlet; one or more drying units comprising a perforated cylindrical tube extending between the inlet and outlet and a screw extending axially of the tube, wherein one of the tube and the screw are rotatable to move extruded composition from the inlet to the outlet; and means for circulating drying air through the passageway.

3. The method of claim 1, wherein the method further comprises the step of milling the dried composition to form a crumb.

4. The method of claim 3, wherein the crumb has a water content from 0.5% to 1.0% by weight.

5. The method of claim 4, wherein the crumb has a water content from 0.5% to about 0.6% by weight.

6. The method of claim 1, wherein the crumb has a maximum dimension from about 0.1 mm to about 5 mm.

7. The method of claim 1, wherein the gelling agent is guar gum.

8. The method of claim 7, wherein the crumb contains from about 0.08% to about 3% by weight of the gelling agent.

9. The method of claim 8, wherein the crumb contains from about 0.1% to about 3% by weight of the gelling agent.

10. The method of claim 1, wherein the gelling agent is selected from the group consisting of natural gums and combinations thereof.

11. The method of claim 1, wherein the natural gum is selected from the group consisting of guar gum, locust bean gum, gum arabic, tragacanth, gum karaya, gum ghatti, xanthan gum and combinations thereof.

12. The method of claim 1, wherein the crumb contains from about 0.06% to about 4% by weight of the gelling agent.

13. The method of claim 1, wherein the extruded pellets are dried in the rotary dryer by employing a counter current stream of hot air having a temperature in the range of 120° C.-160° C.

14. The method of manufacture of a crumb of claim 1, further comprising after the drying step, the step of milling and dried composition to form a crumb with a water content of 0.1% to 1.5% by weight.

15. A crumb, comprising:
    milled farinaceous particles of an extruded composition comprising flour;
    a hydrocolloid gelling agent uniformly distributed throughout the crumb; and
    optional further ingredients;
    wherein the total water content of the crumb is from 0.1% to 1.5% by weight.

16. The crumb of claim 15, wherein the crumb has a water content from 0.3% to about 1.0% by weight.

17. The crumb of claim 16, wherein the crumb has a water content from 0.5% to about 0.6% by weight.

18. The crumb of claim 15, wherein the crumb has a maximum dimension from about 0.1 mm to about 5 mm.

19. The crumb of claim 15, wherein the crumb contains from about 0.06% to about 4% by weight of the hydrocolloid gelling agent, and the gelling agent is guar gum.

20. A crumb, comprising:
    milled farinaceous particles of an extruded composition comprising flour;
    a gelling agent chosen from the group consisting of natural gums, modified gums, pectin, alginate, arabinogalactan, agar, carrageenan, furcellaran, and combinations thereof wherein the gelling agent is uniformly distributed throughout the crumb; and
    optional further ingredients;
    wherein the total water content of the crumb is less than 1.5% by weight.

* * * * *